No. 885,646. PATENTED APR. 21, 1908.
M. B. PRIEST.
VEHICLE TIRE.
APPLICATION FILED FEB. 18, 1907.
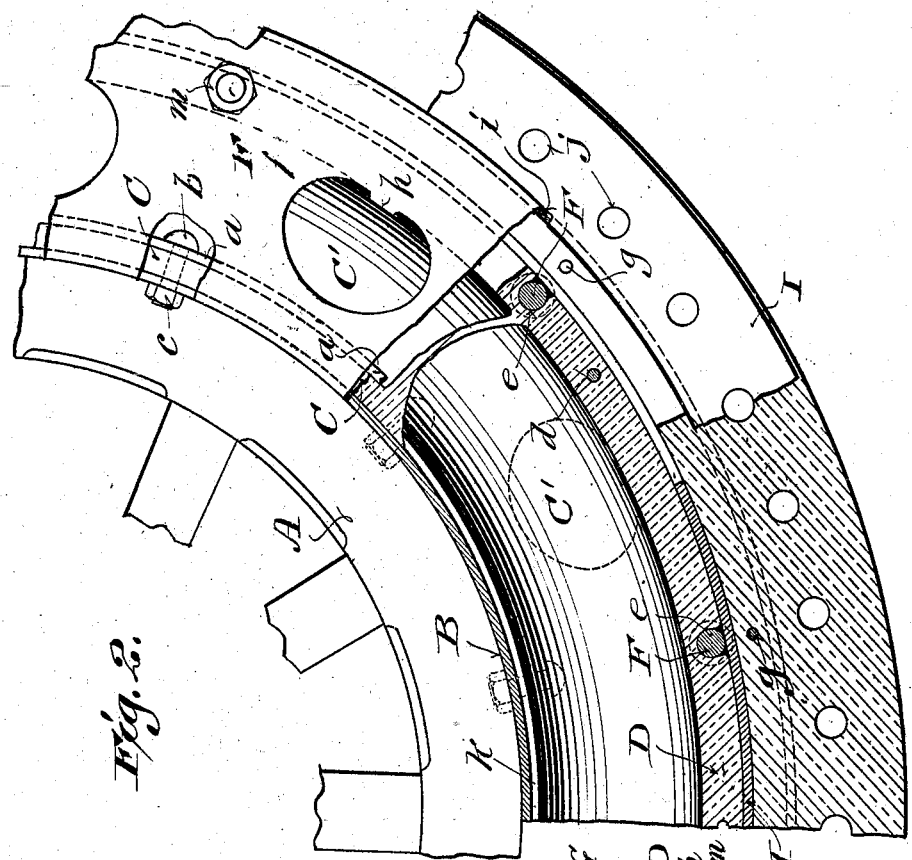
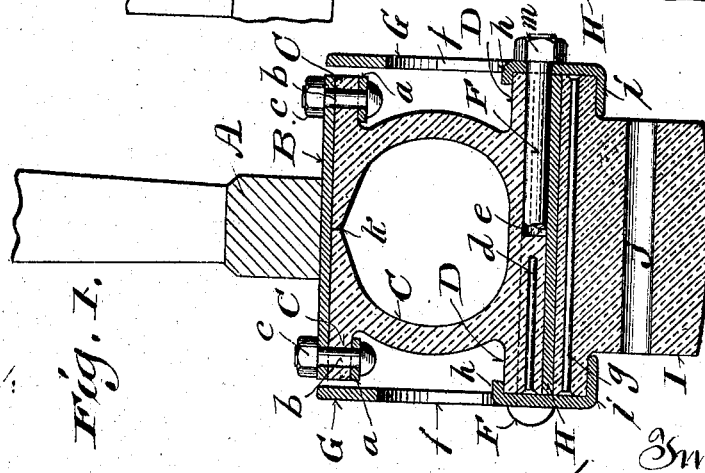

UNITED STATES PATENT OFFICE.

MARY B. PRIEST, OF MILWAUKEE, WISCONSIN, ASSIGNOR TO THE PRIEST TIRE COMPANY, A CORPORATION OF WISCONSIN.

VEHICLE-TIRE.

No. 885,646.　　　　Specification of Letters Patent.　　　Patented April 21, 1908.

Application filed February 18, 1907. Serial No. 357,809.

*To all whom it may concern:*

Be it known that I, MARY B. PRIEST, a citizen of the United States, and resident of Milwaukee, in the county of Milwaukee and State of Wisconsin, have invented certain new and useful Improvements in Vehicle-Tires; and I do hereby declare that the following is a full, clear, and exact description thereof.

The object of my invention is to provide a simple, durable, and effective pneumatic-tire, the several parts being so constructed and arranged as to render the same puncture proof and easily assembled, provision being made whereby lateral play and creeping of the tire upon the wheel is avoided.

Said invention therefore consists in certain peculiarities of construction and combination of parts as hereinafter fully set forth with reference to the accompanying drawings and subsequently claimed.

In the drawings: Figure 1 represents a cross-sectional view of a tire made in accordance with my invention attached to a wheel-rim, and Fig. 2, a fragmentary elevation of the same with a portion broken away and in section to better illustrate the details of construction.

Referring by letter to the drawings, A indicates the wood felly of a wheel provided with a wide metal-rim B, to which are secured flanges C of a pneumatic tire casing. The flanges C are held in place between the rim and metal-rings $a$ by a series of bolts $b$, which bolts pass through the rings, flanges, and rim, and are held in place by nuts $c$. This construction securely confines the tire-casing to the wheel-rim and thus prevents the same from creeping thereon, the bolts and rings being readily detached when it is desired to insert an inner-tube.

The casing, as shown, is circular in cross-section, its semi-circular side-walls C' being merged into the flanges C and an outer flange D, which flange has molded therein suitable stay-rods $d$, alternating with bolt-openings or cross-grooves $e$ for the reception of bolts F that serve to clamp a pair of annular side-guards G thereto. The side-guards are of sufficient width to extend to a point adjacent the metal wheel-rim, there being a clearance between the edges of the same and the inner faces of said guards, in order that the same may have free vertical motion without contacting with the rim, except when the tire is subjected to lateral strain.

A space between the side-walls of the tire-casing and those of the guards G is provided to permit free expansion of said casing, the said guards being formed with openings $f$ through which mud or other foreign substances may be expelled. The outer flange D of the casing is faced with a metal-band H, over which is fitted a flanged rubber-tread I having the flanged portion thereof provided with stay-rods $g$. The said flanged portion together with the band and outer flange D of the casing, are clamped together by inturned lips $h$ and flanges $i$ of the side-guards, the lips $h$ being formed by extension at the base of the openings $f$ thereof.

As shown, the rubber-tread is provided with a series of perforations $j$ that serve to add resiliency to said tread, but it is understood that in some cases the same may be dispensed with.

In assembling the tire, the casing, band and tread are first put in position one upon the other, the inner-tube (not shown) having been inserted through the division K formed in the casing, and after the rings are fitted to the said tire-casing the assemblage is bolted to the wheel-rim. The side-guards are then placed in position, and the bolts F which pass through apertures in said guards are then adjusted and drawn up firmly by nuts $m$ so that the tire as a whole is thereby firmly clamped to the wheel-rim and held against motion, except in a vertical direction.

By the above construction it will be seen that the tire may be readily assembled or detached for replacing worn parts, while being at the same time free to expand or contract with its metal-band, side-guards and tread, to accommodate itself to inequalities in the road. The metal-band H of said tire serves to protect the same against puncture.

While I have shown and described a divided casing for the insertion therein of an inner-tube of soft rubber, it is understood to be within the scope of my invention to provide a single tube or closed casing, in which case the casing would be similar to that shown, with the exception of the division K therein.

The construction and arrangement of the rings $a$ that serve to clamp the tire-casing to the wheel-rim, is such that a water-tight joint is obtained between said casing and rim, thus preventing any moisture from entering the aforesaid casing and causing deterioration of the inner-tube therein, the device as a whole being so thoroughly clamped in connection with the outer metal-band, as to render slipping of the parts, one upon the other, in driving, impossible.

I claim:

A vehicle-tire comprising a flat metal wheel-rim, a one-piece pneumatic casing having inner flanges projecting from its side-wall fitted to the wheel-rim, rings fitted over the inner flanges of the casing, securing-bolts connecting the rings and wheel-rim, a flat casing tread having flange-extensions projecting beyond the side-walls of said casing, cross-grooves in the face of the tread, a metallic band fitted to the tread, a detachable rubber tread having flanges coincident with the flange-extensions of the casing-tread mounted upon the metallic band, an apertured metallic side-guard having flanges engaging the flanges of said detachable tread, lips extending from the apertured portion of the side-guard engaging the flange-extensions of the casing, and clamping-bolts in connection with the side-guards fitted into the cross-grooves.

In testimony that I claim the foregoing I have hereunto set my hand at Milwaukee in the county of Milwaukee and State of Wisconsin in the presence of two witnesses.

MARY B. PRIEST.

Witnesses:
 GEO. W. YOUNG,
 FRED PALM.